United States Patent [19]

Czach

[11] Patent Number: 5,366,580
[45] Date of Patent: Nov. 22, 1994

[54] HIGH FREQUENCY WELDING MACHINE

[75] Inventor: Richard W. Czach, West Babylon, N.Y.

[73] Assignee: Cosmos Electronic Machine Corp., Farmingdale, N.Y.

[21] Appl. No.: 818,141

[22] Filed: Jan. 8, 1992

[51] Int. Cl.⁵ ...................... B32B 31/00; G05G 15/00
[52] U.S. Cl. ...................................... 156/359; 156/64; 156/73.5; 156/273.9; 156/368; 156/378; 156/379.6; 156/583.7; 156/583.9; 331/34; 425/174.2; 425/174.6
[58] Field of Search ............... 156/359, 367, 368, 378, 156/379.6, 499, 583.7, 583.9, 64, 73.5, 228, 244.17, 272.2, 304.6, 273.9; 264/27; 425/174, 174.2, 174.6; 331/34

[56] References Cited

U.S. PATENT DOCUMENTS

| | | | |
|---|---|---|---|
| 2,215,582 | 9/1940 | Goldstine | 331/34 |
| 2,731,564 | 1/1956 | Edlstein | 331/34 |
| 3,041,548 | 6/1962 | Keen et al. | 331/34 |
| 3,409,841 | 11/1968 | Munn | 331/34 |
| 4,179,252 | 12/1979 | Seufert | 425/174.6 |
| 4,421,589 | 12/1983 | Armini et al. | 156/359 |
| 4,684,789 | 8/1987 | Eggleston | 156/272.2 |
| 4,854,993 | 8/1989 | Celia | 156/359 |

*Primary Examiner*—Mark Osele
*Attorney, Agent, or Firm*—Lilling & Lilling

[57] ABSTRACT

The high frequency welding machine utilizes the computer or central processing unit, various means for sensing various parameters of the welding machine, and various means for activating various components of the machine. In particular, the computer maintains information on the parameters of the welding machine and automatically selects the necessary commands for the various components of the machine.

7 Claims, 6 Drawing Sheets

HIGH FREQUENCY WELDING MACHINE

BACKGROUND OF THE INVENTION

1. Field of the Invention

The invention pertains to the field of high frequency welding of thermoplastic materials, and more particularly, to an improved machine for welding which operates under the principle of high frequency oscillation of a voltage applied to the thermoplastic materials causing an internal heating and fusion of the materials.

2. Description of the Related Art

High frequency welding machines for thermoplastic materials are known in the art. Such welding machines as are known in the art are manually operated by a technician who must control the lengths of the treatment periods of the thermoplastic material, as well as other operating parameters of the machine. Because these machines are manually operated, their full potential regarding efficiency and intricate applications is not realized.

By way of background information, a typical high frequency welding machine welds thermoplastic materials together by subjecting these materials to a high voltage which is oscillated at a high frequency to cause bi-polling of the molecules of the materials being welded. The rapid oscillation of the voltage causes friction between the molecules to cause an internal heating which eventually results in a weld of the materials. The voltage is applied to the materials through dies on either side of the materials to be welded. The dies form a capacitor between which the materials to be welded are placed.

The improvement that is the subject of this application is the use with such a machine of automatic sensing and computing units in order to automate the operation of the machine.

SUMMARY OF THE INVENTION

The invention is used in conjunction with a conventional high frequency welding machine for thermoplastic materials. More particularly, the invention comprises a computing device, which has a central processing unit, a memory storage unit, sensors for detecting the levels of certain parameters of the machine, and devices for controlling certain parameters of the machine. In operation, the invention permits automatic selection and control of the parameters and operations of the high frequency welding machine.

In particular, the computing device includes a plate current sensor that detects plate current being supplied to an oscillator tube of the machine. Using this information, the computer turns an output circuit of the machine to control the power being applied to the dies of the machine, or the load. The computing device also comprises a sensor of die temperature for monitoring the changes in operating temperatures of the die, and a sensor (arcquench sensor) for detecting a "burn" or formation of a spark between the plates of the die which may damage the thermoplastic material. There are also activation units for setting parameters of the machine responsive to commands issued by the CPU. These parameters can include plate current, die temperatures, press position, incoming air pressure of oscillator tube cooling air, plate current overload and turn table position, as well as presealing time, sealing time and cooling time in the treatment cycle of the machine.

BRIEF DESCRIPTION OF THE DRAWINGS

A detailed description of a preferred embodiment of the invention follows, wherein reference is made to the accompanying figures which are briefly described as follows.

DESCRIPTION OF THE PREFERRED EMBODIMENTS

Figure 2:
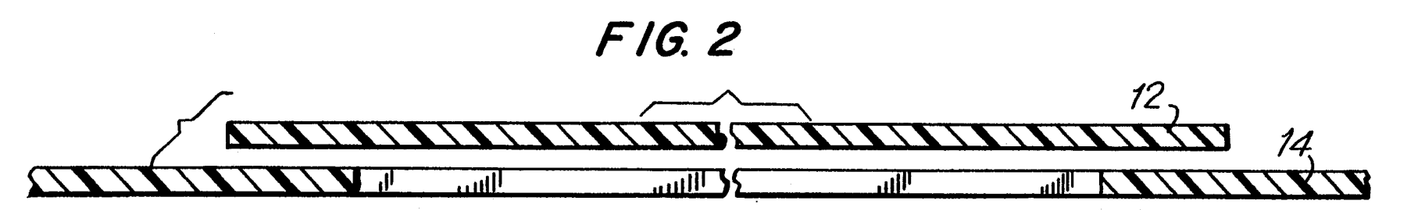
FIG. 2 is a cross-sectional view of thermoplastic materials prior to treatment.
Figure 3:
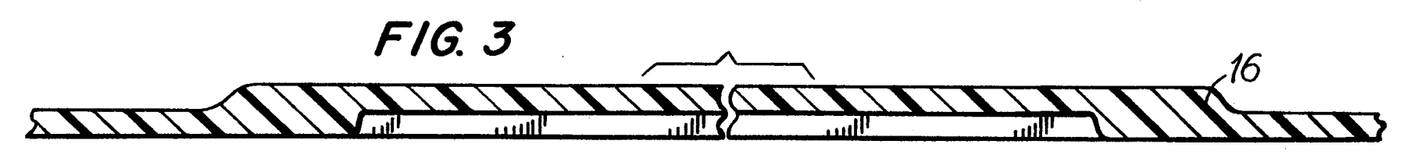
FIG. 3 is a cross-sectional view of thermoplastic materials after treatment.
Figure 4:
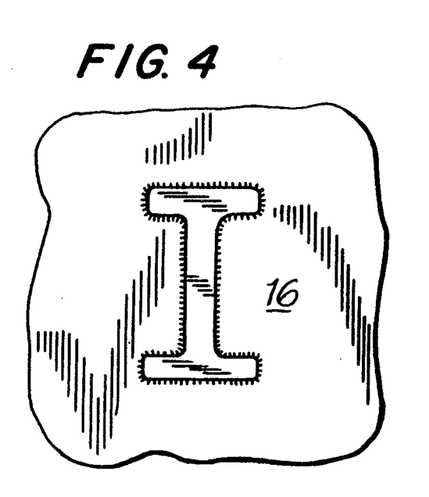
FIG. 4 is a top view of a typical workpiece.
Figures 5, 9:
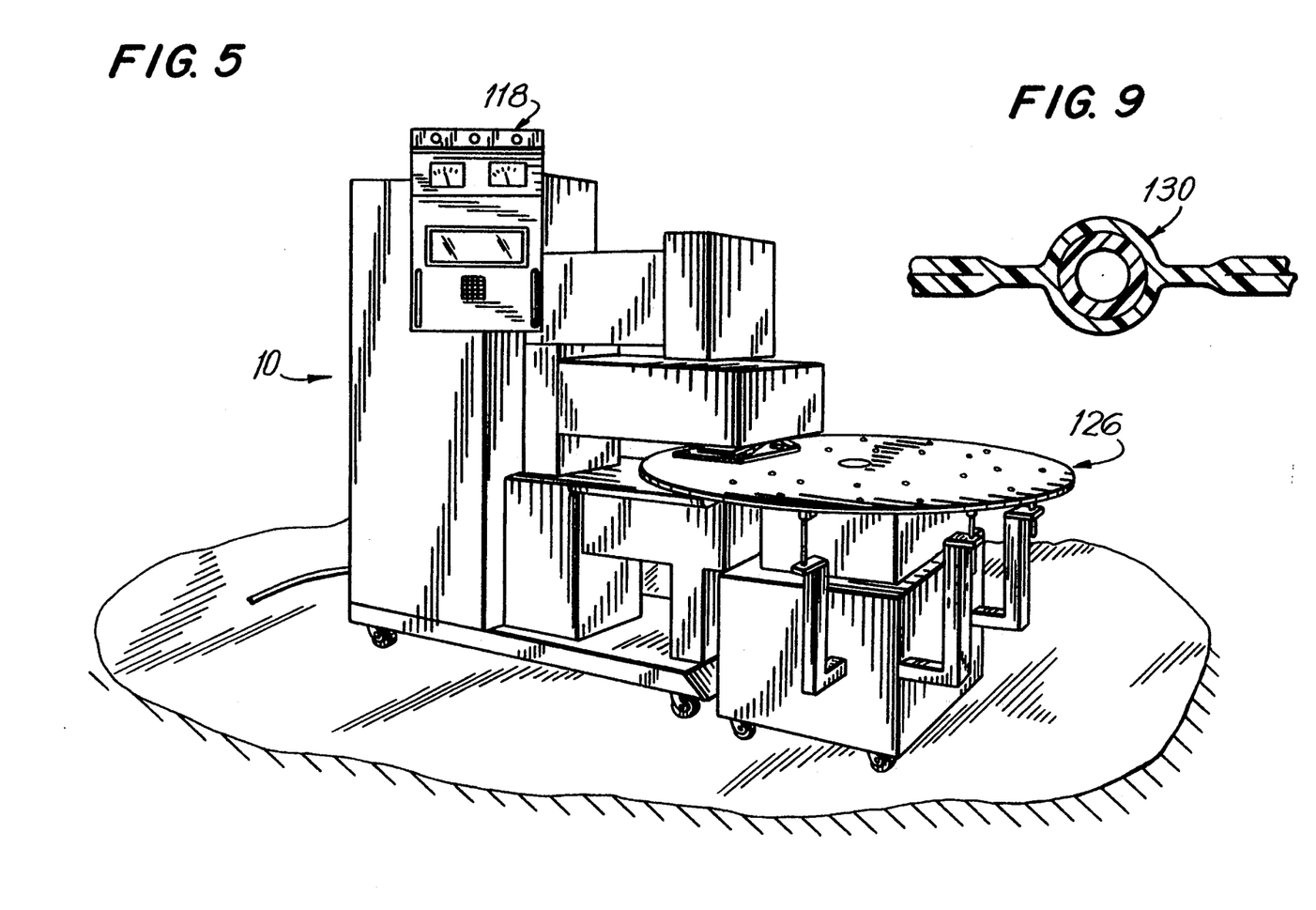
FIG. 5 is a perspective view of an alternate embodiment of the invention in its environment.
FIG. 9 is a cross-sectional view through the lines 9—9 of FIG. 8.

The invention works with any conventional high frequency welding machine for thermoplastic materials. For illustrative purposes, shown in FIGS. 1-9 of the drawings are several versions of high frequency welding machines 10 as well as samples of materials to be welded. These machines may be used for high frequency welding of several separate materials 12 and 14 (FIG. 2) into a single unified and integral material 16 (FIG. 3).

The typical welding machine 10 (FIG. 1) includes operating portions which form a capacitor 18, wherein the thermoplastic material 12 serves as a dielectric. In addition, the machine includes an oscillator 20, and a supply of a large voltage, 1,500 Volts RF, for example. The voltage is applied across the capacitor 18, and the oscillator 20 causes the applied voltage to oscillate at a frequency of, for example, 27 megacycles. This oscillating voltage stresses the dielectric (the thermoplastic material 12) and causes a "leakage current". The combination of the bi-polling of the molecules (caused by the oscillator) and the stress on the thermoplastic material from the high voltage causes internal friction between the molecules which causes internal heating of the materials. This causes a breaking down and merging of the internal structures of the two thermoplastic materials and permits them to be joined together into a single unitary and integral piece of material 16.

Figure 1:
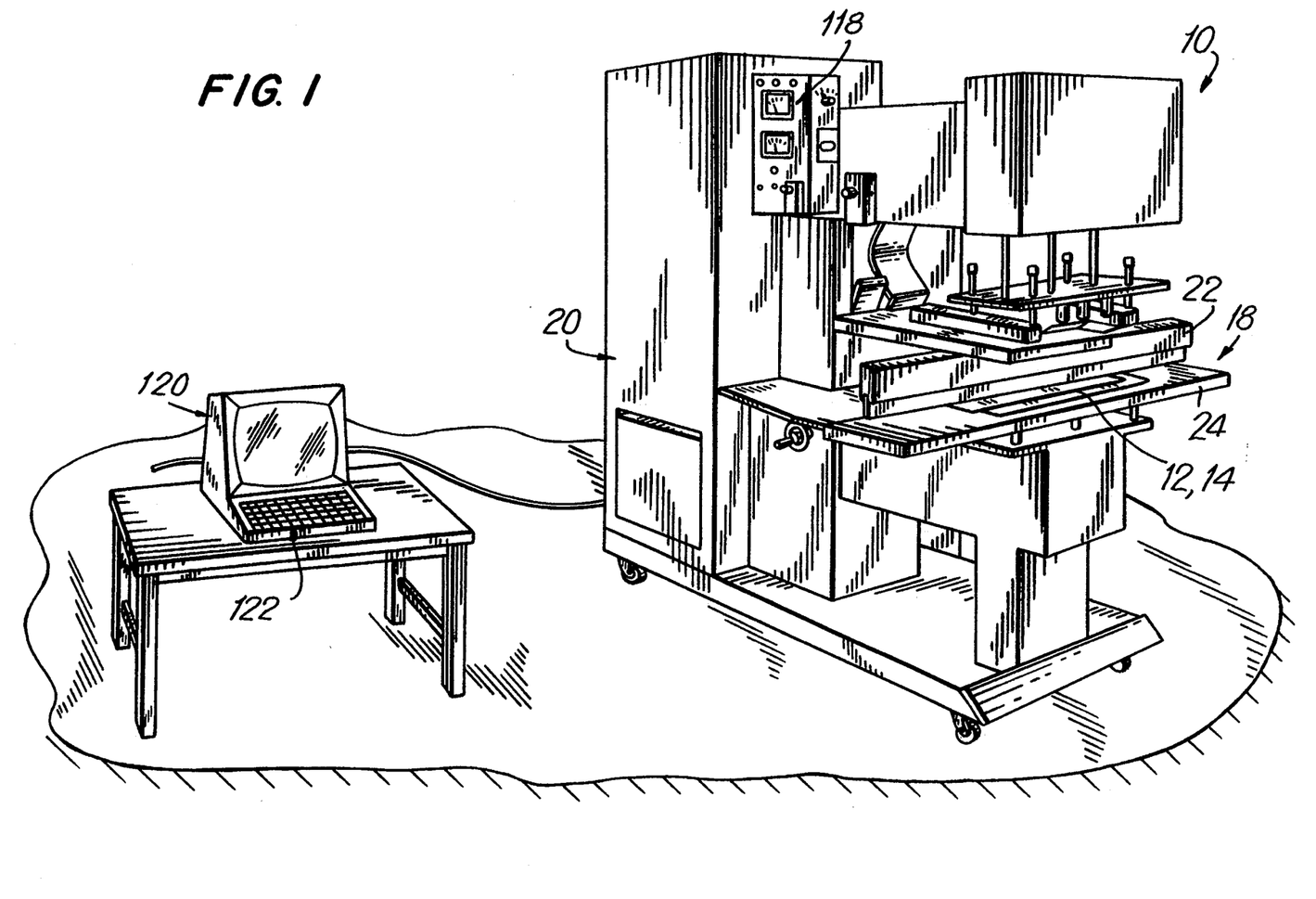
FIG. 1 is a perspective view of the invention in it's environment.

In the typical HF welding machine, the capacitor 18 comprises upper 22 and lower 24 dies, between which the thermoplastic materials are placed. The dies may be of any desired shape, and should follow the shape of the desired weld of the materials that are to be welded together. For example, if the desired weld of the materials is oval in shape, then the dies would be oval.

In the preferred embodiment of the invention, the treatment takes place in several stages. After the material to be treated is in place, the first stage is known as the presealing stage. For a period of time known as the presealing time, the dies 22, 24 are pressed together with the thermoplastic materials between them. This is done before voltage is applied to the dies, and ensures that the material is smooth and that there are no air gaps between the materials which may cause a "burn" to occur or result in a bad weld.

Then, the RF power is activated and applied to the dies 22, 24 during a sealing stage. The time during which the power is activated is referred to as the sealing time. During the sealing process, the high frequency oscillations cause the above-described internal heating of the materials and their fusing together.

After power is deactivated, everything is left in place for a cooling stage, a period of time referred to as the cooling time. This permits the materials to cool and to set, so that the dies can be separated from the material without damage to the finished product.

Figure 10:
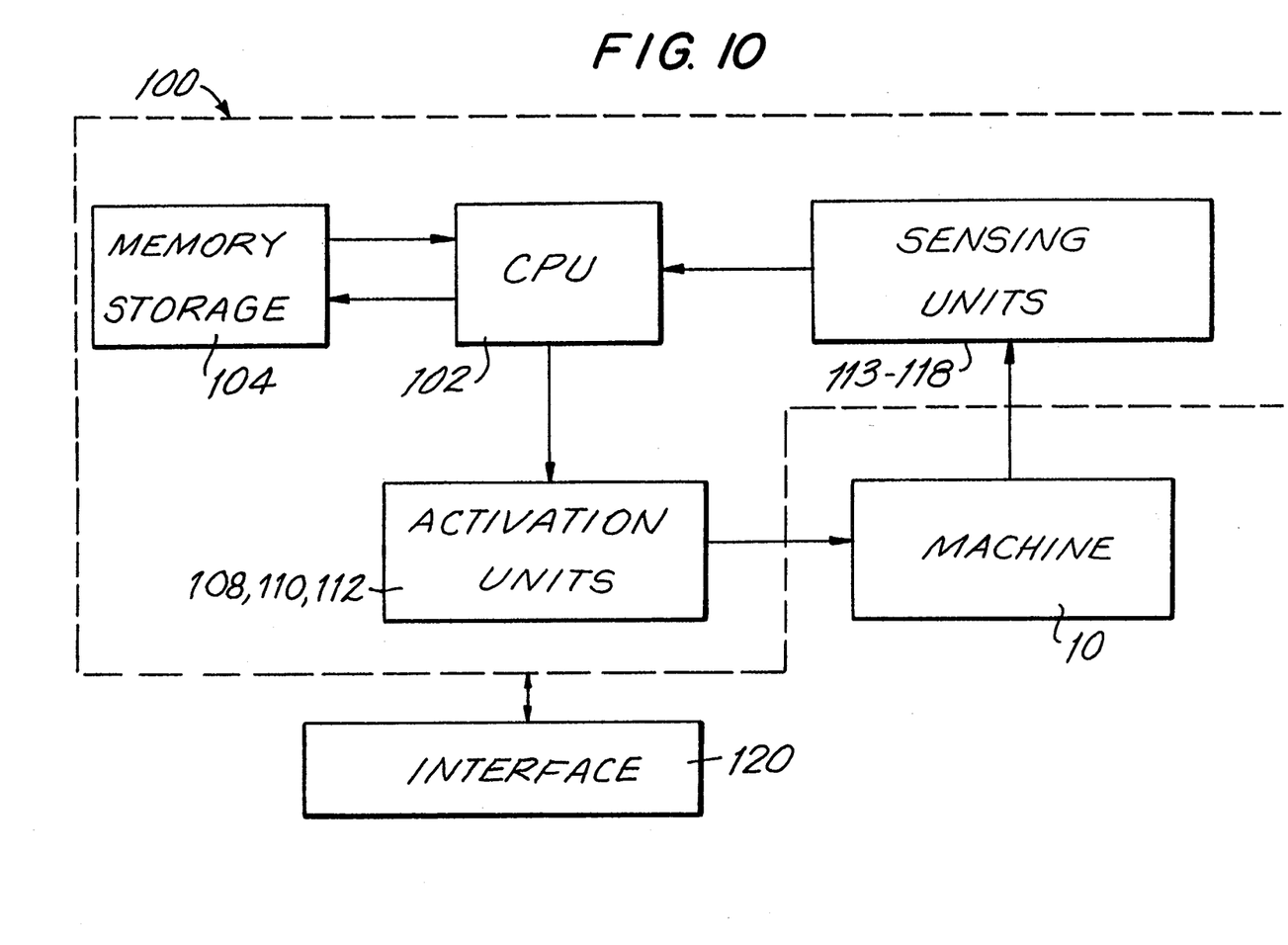
FIG. 10 is a schematic diagram showing the various elements of the invention.

The invention consists of a computing device 100, FIG. 10, which comprises a central processing unit 102, a memory storage unit 104, activation units 108, 110 and 112, and sensing units 113–118. In a preferred embodiment of the invention, the computing device and all of the elements which constitute it can be combined into a single special purpose computer.

The central processing unit (CPU) 102 can be any conventional integrated circuit which is capable of data processing and activation of remote units such as, for example, a standard 6809 processor made by Motorola.

The memory storage unit 104 may be any conventional ROM memory storage device for a computer, such as a standard 27256. Such devices are made by Texas Instruments, IGS Thompson, Motorola and National Semiconductor.

The computing device 100 includes a sensor 114 for determining the plate current in the oscillator. This measurement of the input voltage is proportional to the output voltage of the unit, which is applied to the capacitor or load.

The sensor 114 can be either a dual setpoint mechanical plate current meter with relay outputs to indicate whether or not the plate current is above or below the set points or an analog to digital card reading voltage across a dropping resistor in the plate current line. This varying voltage is then translated to a digital signal via the analog to digital card and transmitted into the CPU unit 102.

A sensor of die temperature 115 may also be included in order to monitor the temperature of the upper 22 and lower 24 dies. This can be used to ensure that the machine is not operated at a temperature which may damage the materials to be treated. The sensor 115 can be either a thermal couple tied directly into a co-processing unit which will determine the die temperature, or a mechanical snap action thermal switch to determine that the die has reached a preset temperature.

A sensor of press position 113 may also preferably be included in the device, which conveys to the CPU 102 the position of the upper 22 and lower 24 dies. The sensor 113 may constitute a mechanical activated limit switch for the up position and a pressure activated pressure switch for the down position.

The sensors 114, 115 and 113 are standard devices that are known in the art. The above examples are provided for the sake of illustration and to describe the devices that are used in the preferred embodiment of the invention. Any other suitable sensors that are known may similarly be used.

In the preferred embodiment, which utilizes a turntable 126 to supply work to the welding machine in stages while workpieces are arranged on various other work stations of the turntable, a sensor of turntable position 117 may also be included in the computing device 100. This sensor 117 would serve the purpose of conveying the position of the turntable to the CPU 102. The sensor 117 may be a mechanical limit switch which will indicate that the turntable is in position.

The oscillator 20 of the device is cooled by incoming air, the pressure of which may also be monitored by a sensor 118 of cooling air pressure. This information is likewise conveyed to the CPU 102. The sensor 118 may be a mechanical vane switch used to measure cooling air flow to the oscillator tubes.

The activation units of the computing device 100 (FIG. 10) preferably includes a unit 108 for controlling the level of the input power, a unit for controlling press positions of the dies, a unit 110 for controlling the position of the turntable and a unit 112 for responding to changes in die temperatures. Internally, the computing device will keep track of the preseal time, the sealing time, and the cooling time. The activating unit 108 may be constituted by a stepping motor controlled by a stepping motor card which obtains information and instructions directly from the CPU unit 102 via an 8 bit bus. An air operated solenoid valve may be used to control the position of the die, and is known in the art. A mechanical Geneva drive turntable unit is used to control the position of the turntable and is activated on and off through the CPU unit; such devices are well known in the art. The activating unit 112 may be a relay contactor which turns off electrically heating rods when the die temperature reaches a predetermined setting.

Through monitoring the various above-described operating parameters of the machine, such as the plate current, die temperature, press position, turntable position and cooling air pressure, the CPU can issue commands to tune the machine to minute changes in the operating parameters in order to maintain a steady and constant output power and die temperature resulting in higher quality welds. The CPU communicates with the various devices of the machine through a machine language program on an eprom via an 8 bit bus to the via/pia port chips and RAM via an 8 bit bus, as is well understood and known in the art. The quality of welds obtainable with such a device cannot be obtained through conventional manually operated methods.

In some embodiments, it may be desirable to use a sensor 116 for determining the grid current within the oscillator. This is useful for monitoring the activity of the capacitor in order to shut down the machine when the grid current is in excess of acceptable levels. The grid current sensor may be connected to a display or gauge 119 on the welding machine 10. It may be desirable for the grid current sensor 116 to be connected to the welding machine 10 in such a fashion that, if the grid current exceeds a certain preselected level, then the entire machine is automatically shut down. The sensor 116 may be constituted by an analog to digital card with the computer displaying the grid current.

The sensor 114 for determining plate current in the oscillator could preferably comprise an analog or a setpoint meter, or a limit sensing meter or A-D input card tied into the plate current circuit. The sensor of die temperature may be, for example, external temperature control units. The sensor of press position may preferably comprise, for example, a limit switch or pressure switch. The sensor of turntable position may also preferably comprise a limit switch. Incoming cooling air pressure is also monitored by a pressure switch.

Through monitoring of the above-described parameters, complicated welds 128 (FIG. 8, 9) are made possible. For example, a circular weld performed by a prior art machine would require a new setting for each component of the weld. The disclosed invention, however, is capable of making an adjustment in the output of the machine to provide the proper power for each component.

Figure 6:
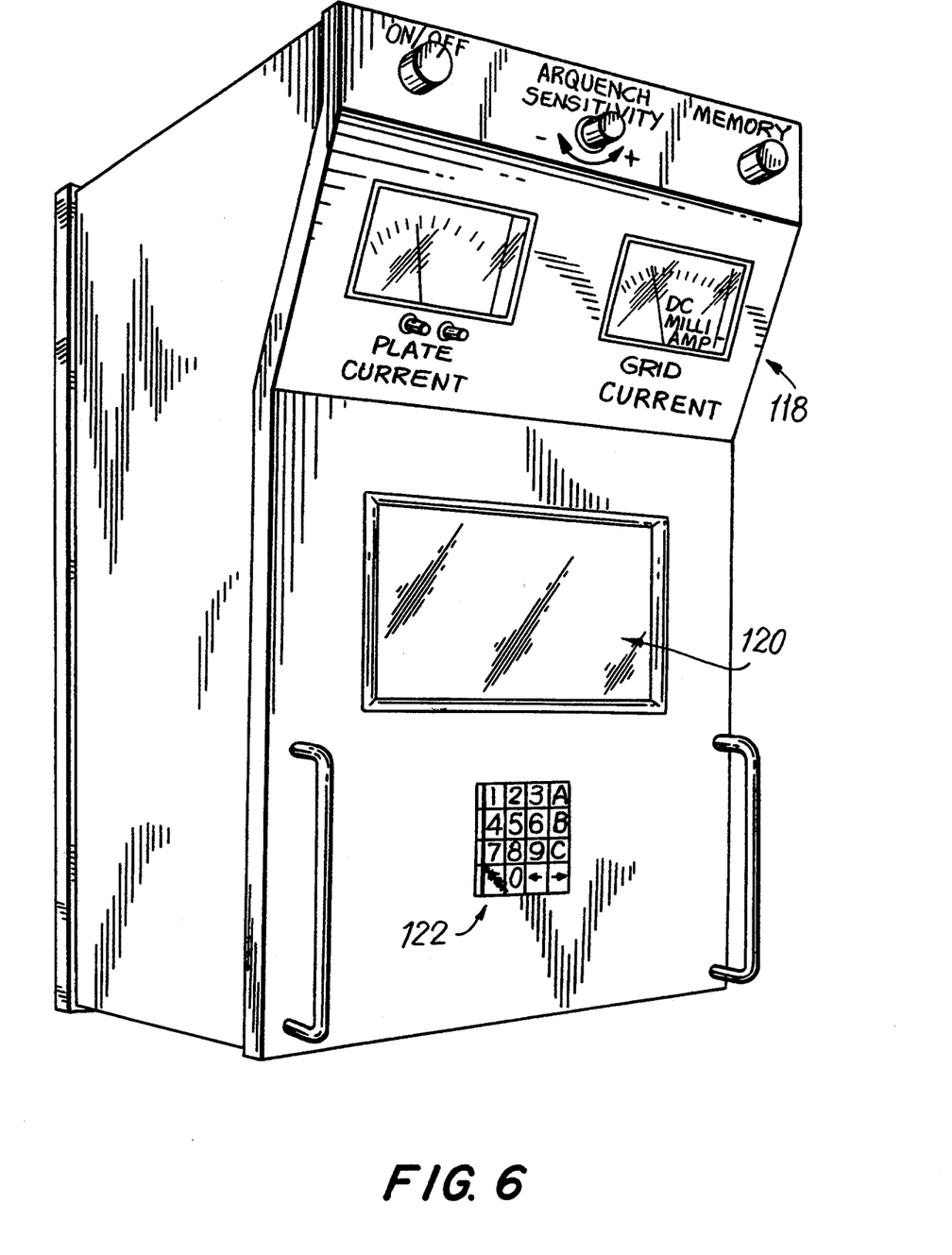
FIG. 6 is a perspective view of the controls and displays of the computer in their environment.
Figure 7:
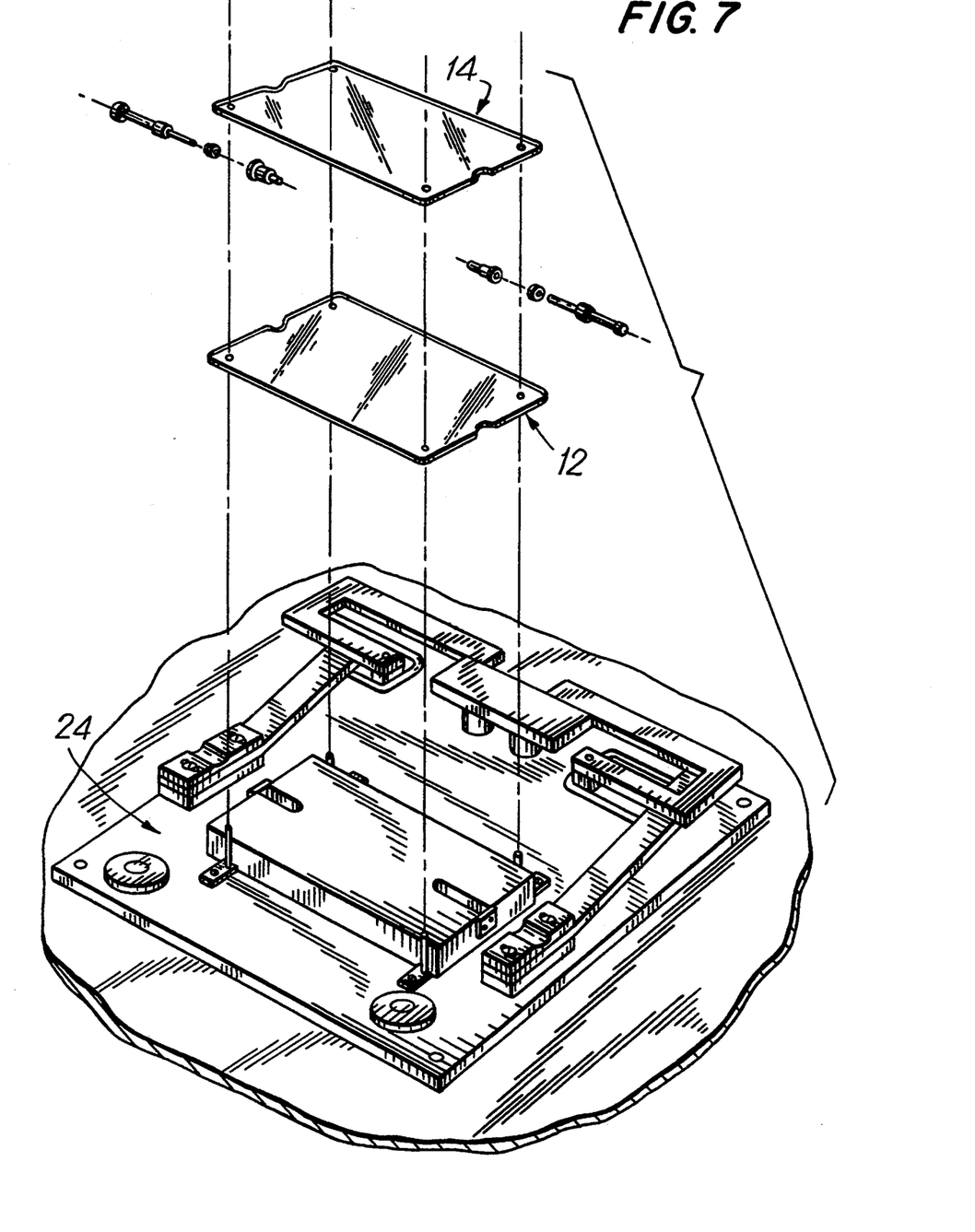
FIG. 7 is an exploded perspective view of a tool or die for the welding machine showing the positioning of a workpiece.
Figure 8:
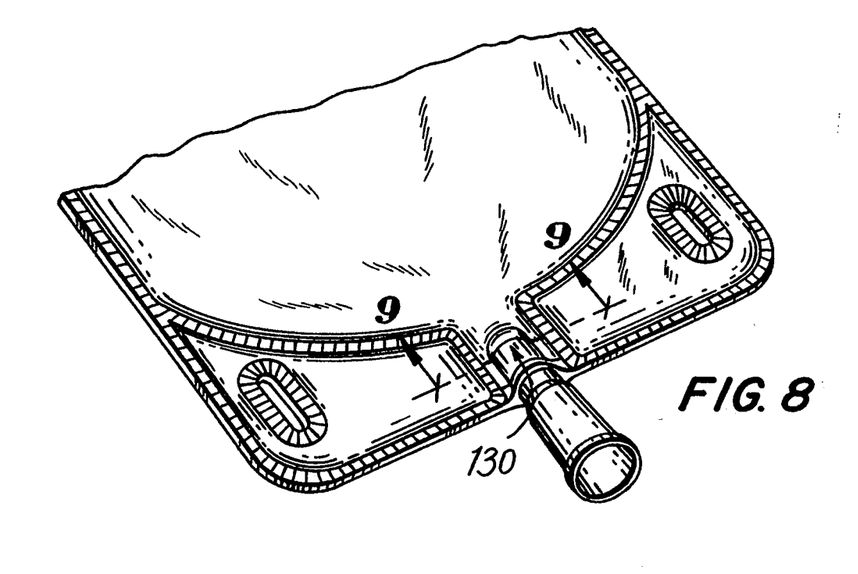
FIG. 8 is a perspective view of the workpiece of FIG. 7, after treatment.

For ease of operation, the computing device preferably includes a screen 120 for interfacing with the operator and an appropriate keyboard 122 for the operator to input information and instructions into the computing device 100.

In operation, the operator uses the keyboard to recall, from the memory storage 104, the settings for the machine for a particular set of materials of a particular shape for a particular die. This information is shown to the operator on the screen 120. The operator then has the opportunity to either use these preset parameters or the operator may override them and insert specific parameters for that job.

Once the parameters for the job are set into the computer (either by selecting the parameters from the memory storage 104 or by entry of specific parameters by the operator), the computing device 100 sends signals via the activation units 108, 110 and 112 to the machine. In this way, the level of power is selected, as is the presealing time, the sealing time and the cooling time. Thereafter, the machine will work in the conventional fashion.

During operation of the machine, the computer monitors the power via the sensor 114, as well as the die temperature via the sensor 115. In this way, the computing device 100 can constantly modify the parameters of the machine in order to make sure the finished product is uniform, even though there may be variations during the course of the day in the temperature of the dies, the power supply, the type of materials, etc.

In the preferred device, after each job, the computer records, in the memory storage unit 104, the parameters and settings for each job. In this way, the operator at a later point in time can see the settings and parameters for each job that was completed by the machine. It may be desirable to connect the computing unit 100 to a printer 124, in order to obtain a printed copy of the information regarding the settings and parameters for each job.

In the preferred embodiment, the invention can also be used to run a turntable 126 which supplies work in stages, first to turntable loaders and then to the machine 10 for welding. As previously indicated, the embodiment which includes a turntable 126 also includes the sensor 117 of turntable position, and the activation unit 110 for operating the turntable. Through this circuitry, the CPU 102 is able to control the position of the turntable 126, as well as the period of delay between each partial rotation of the turntable 126.

It is understood that the above-description is of a preferred embodiment of the invention. Further, numerous modifications may become apparent to a person skilled in the art. Accordingly, the above-description is intended as a preferred embodiment only, and is not a limitation upon the scope or spirit of the appended claims.

We claim:

1. A computing device for a high frequency welding machine for thermoplastic materials, comprising:
   a central processing unit;
   means for sensing a plate current in an oscillator tube of the machine;
   means for sensing operating temperature of dies of the machine, each sensing means being connected to the central processing unit to convey operating parameters of the machine to the central processing unit; and
   means for activating components of the machine, connected to the central processing unit so that commands can be issued to adjust operating parameters of the machine.

2. A computing device according to claim 1, further comprising a sensor of press position.

3. A computing device according to claim 2, further comprising a sensor of incoming air pressure at the oscillator tube.

4. A computing device according to claim 3, further comprising a sensor of plate current overload.

5. A computing device for a high frequency welding machine for thermoplastic materials having a turntable for supplying work to the machine in stages, comprising:
   a central processing unit;
   means for sensing a plate current in an oscillator tube of the machine;
   means for sensing operating temperature of dies of the machine;
   means for sensing press position of the machine;
   means for sensing incoming air pressure at the oscillator tube of the machine;
   means for sensing turntable position of the machine, each sensing means being connected to the central processing unit to convey operating parameters of the machine to the central processing unit; and
   means for activating components of the machine, connected to the central processing unit so that commands can be issued to adjust operating parameters of the machine.

6. A high frequency welding machine for thermal plastic materials having an oscillator, a capacitor defined by dies and wherein the thermal plastic material serves as a dielectric between said dies of said capacitor, wherein the improvement comprises:
   central processing unit;
   memory storage unit connected to said central processing unit;
   means for sensing various parameters of the machine including sensing means for determining the plate current in said oscillator, sensing means for monitoring the temperature of said dies, sensing means for determining the position of said dies, sensing means for determining a position of a turntable, sensing means for determining the pressure of incoming cooling air and sensing means for determining the grid current within the oscillator, wherein each of said sensing means are connected to said central processing unit; and
   means for activating various components of the machine and connected to said central processing unit.

7. A high frequency welding machine for thermoplastic materials having an oscillator, a capacitor, defined by dies and wherein the thermal plastic material serves as a dielectric between said dies and said capacitor, wherein the improvement comprises:
   central processing unit;

memory storage unit connected to said central processing unit;
means for sensing various parameters of the machine and connected to said central processing unit; and
means for activating various components of the machine, means for controlling the level of the impact power, means for controlling the press position of the dies, means for controlling the position of the turntable and means for responding to changes in die temperature, wherein each of said means are connected to said central processing unit.

* * * * *

UNITED STATES PATENT AND TRADEMARK OFFICE
CERTIFICATE OF CORRECTION

PATENT NO. : 5,366,580
DATED : November 22, 1994
INVENTOR(S) : Richard W. Czach

It is certified that error appears in the above-indentified patent and that said Letters Patent is hereby corrected as shown below:

In column 6-8, begining with line 63 through line 5, claim 7 should read as follows:

-- 7. A high frequency welding machine according to claim 6, further comprising means for controlling the level of the input power, means for controlling the press position of the dies, means for controlling the position of a turntable and means for responding to changes in die temperature, wherein each of said means are connected to said central processing unit.--.

Signed and Sealed this

Seventh Day of March, 1995

Attest:

BRUCE LEHMAN

*Attesting Officer*     *Commissioner of Patents and Trademarks*